United States Patent

Fujigaki et al.

[11] Patent Number: 4,984,859
[45] Date of Patent: Jan. 15, 1991

[54] OPTICAL FIBER RIBBON END-STRUCTURE

[75] Inventors: Takashi Fujigaki, Kanagawa; Yoshikazu Fujinaga, Aichi; Shuichiro Tokuda, Aichi; Noriyuki Furukawa, Aichi; Kiyoshi Ichimura, Tokyo; Yukio Shibuya, Tokyo; Shigeru Iuchi, Tokyo, all of Japan

[73] Assignee: Mitsubishi Rayon Co., Ltd., Tokyo, Japan

[21] Appl. No.: 480,991

[22] Filed: Feb. 16, 1990

Related U.S. Application Data

[63] Continuation of Ser. No. 206,066, Jun. 13, 1988, abandoned.

[30] Foreign Application Priority Data

Jun. 19, 1987 [JP] Japan .................. 62-93352[U]

[51] Int. Cl.$^5$ .................. G02B 6/04
[52] U.S. Cl. .................. 350/96.24; 350/96.1
[58] Field of Search .................. 350/96.22–96.27, 350/96.1

[56] References Cited

U.S. PATENT DOCUMENTS

| 3,294,504 | 12/1966 | Hicks, Jr. | 65/3.68 |
| 4,022,647 | 5/1977 | Yevick | 350/96.24 X |
| 4,188,088 | 2/1980 | Andersen et al. | 350/96.23 |
| 4,878,732 | 11/1989 | Rohner et al. | 350/96.23 |

FOREIGN PATENT DOCUMENTS

| 0236800 | 9/1987 | European Pat. Off. | |
| 3526823 | 2/1987 | Fed. Rep. of Germany | |
| 52-26839 | 2/1977 | Japan | 350/96.23 |
| 53-145644 | 12/1978 | Japan | 350/96.23 |
| 56-123504 | 9/1981 | Japan | 350/96.23 |
| 57-44108 | 3/1982 | Japan | 350/96.23 |
| 58-152205 | 9/1983 | Japan | 350/96.24 |

Primary Examiner—William L. Sikes
Assistant Examiner—John Ngo
Attorney, Agent, or Firm—Sughrue, Mion, Zinn, Macpeak & Seas

[57] ABSTRACT

The invention provides an end structure for at least one optical fiber ribbon wherein the same-side ends of the optical fiber ribbons are bundled together and tightly fitted in a metallic sleeve member so that coating layers of the optical fiber ribbons may be on the inner surface of the metallic sleeve member.

6 Claims, 2 Drawing Sheets

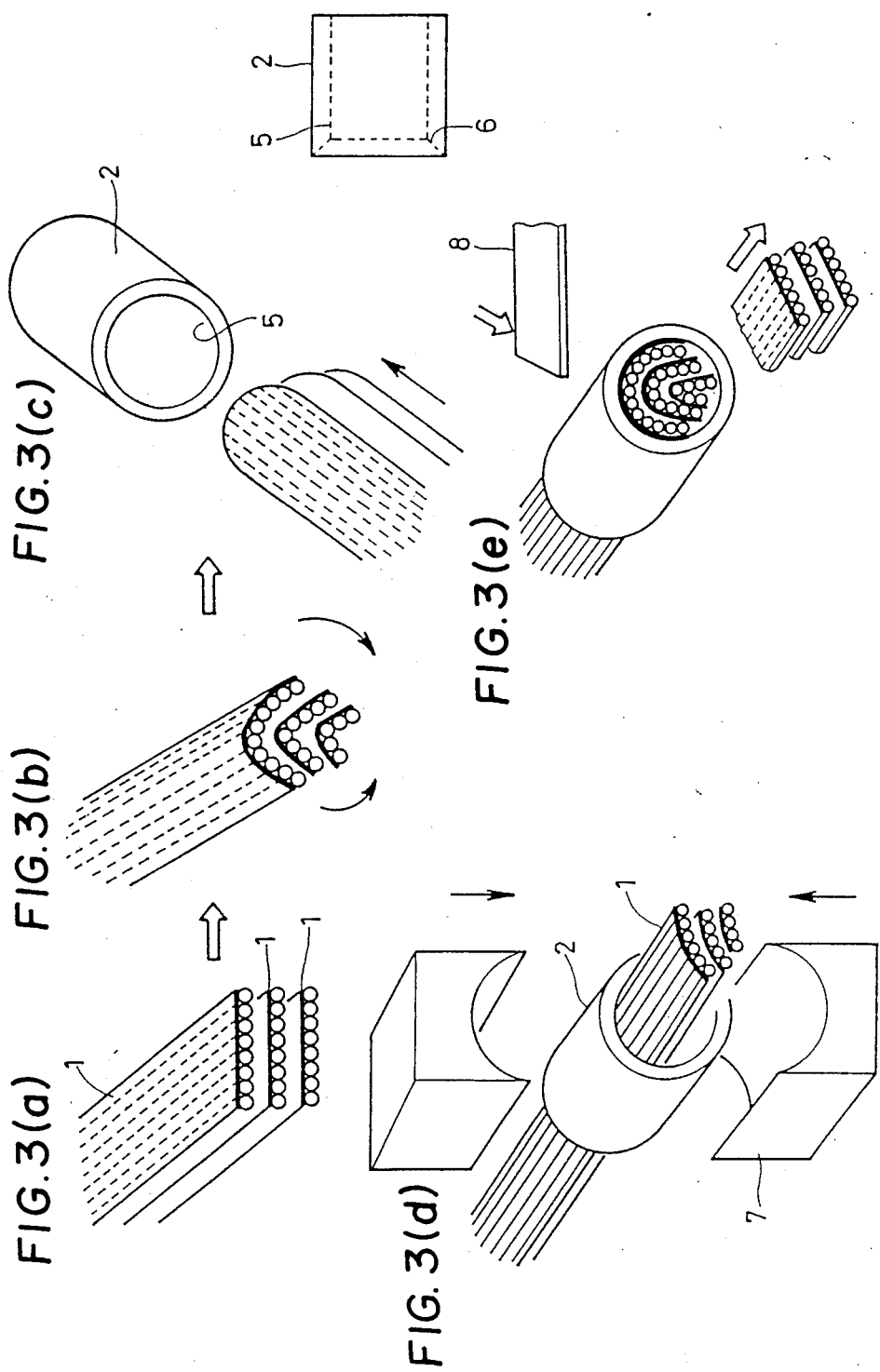

OPTICAL FIBER RIBBON END-STRUCTURE

This is a continuation of application Ser. No. 07/206,066 filed June 13, 1988, now abandoned.

BACKGROUND OF THE INVENTION

1. Field of the Invention

This invention relates to an improved end structure of a single or bundle of optical fiber ribbons for use in light transmission in optical communication, to display unit or from sensing means.

2. Description of the Prior Art

In the prior art, to an end of a bundle of optical fibers, a connector with adhesive or, instead of adhesive, a tightly pressed connector is attached to permit frequent attachment and detachment or coupling of such as a light emitting or receiving element.

Conventional optical fiber ribbons consist of small diameter optical fibers arranged in the form of tape and having a coating layer useful for holding them together. There has not been proposed any connector to be attached to the end of these ribbons and having satisfactory structure.

Besides, use of such a connector that permits semipermanent fastening of the optical fiber end to a light emitting or receiving element results in difficulties such as high manufacturing cost and laborious attachment of the connector. Adhesion of the optical fiber end is not a suitable solution because the adhesive causes optical deterioration with time.

SUMMARY OF THE INVENTION

Under the circumstances, the inventors made a study determine which end structure of a single or bundle of optical fiber ribbons becomes free from the above-mentioned defects. Thus, the present invention has resulted, provided an end structure of a single or bundle of optical fiber ribbons characterized in that the ends of the optical fiber ribbons are tightly pressed together in a metallic sleeve member so that the coating layers are on the inner surface of the metallic sleeve member.

BRIEF DESCRIPTION OF THE DRAWINGS

FIGS. 3(a)–(e) illustrate the outline of process for forming an end structure of an optical fiber ribbon bundle according to the invention.

DETAILED DESCRIPTION OF THE INVENTION

Figure 1A:
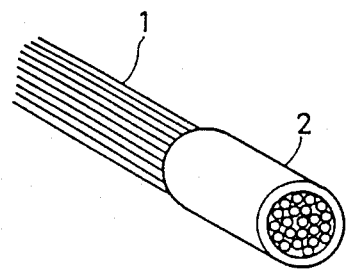
FIGS. 1a and 1b are perspective views of end structures of optical fiber ribbon bundle embodying the invention.
Figure 1B:
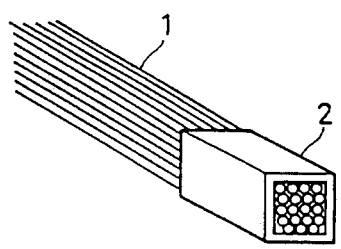
Figure 2A:
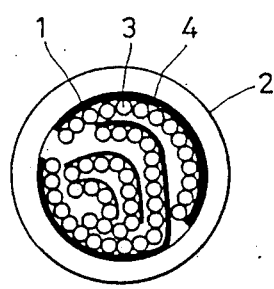
FIGS. 2a and 2b are cross-sectional views of the end structures of FIGS. 1a and 1b, drawn to an enlarged scale.
Figure 2B:
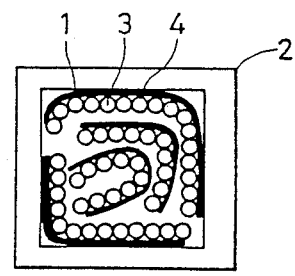

The invention will be described more fully by way of examples with reference to the accompanying drawings hereinafter:

FIGS. 1a and 1b give perspective views of end structures of optical fiber ribbon bundles according to the invention. FIGS. 2a and 2b are cross-sectional views of them, drawn to an enlarged scale, in which reference characters designate an optical fiber ribbon 1. Optical fibers 3 such as of plastic optical fibers, a metallic sleeve 2 fitted over the end of a bundle of optical fiber ribbons 3, and a coating layer 4 as of synthetic resin, on the inner surface of the sleeve 2.

In the following, the process for forming an end structure for optical fiber ribbon bundle embodying the invention will be described referring to FIG. 3, which is a stepwise diagram of the process.

A plurality of optical fiber ribbons 1 is bundled, each ribbon positioning the coating layer at top, as shown in FIG. 3a. The end of the optical fiber ribbon bundle is transversely bent for the coating layer of each ribbon to be on the outer side, as shown in FIG. 3b, and inserted into a metallic sleeve 2 for coating layers 4 to be on the inner surface 5 of the sleeve 2, as shown in FIG. 3c. For making this easy, the sleeve 2 may have a tapered opening 6 through which the end of optical fiber ribbon bundle is inserted. Then the sleeve 2 is pressed in a press 7, as shown in FIG. 3d, so that the total section of the optical fiber ribbons after tight pressing may be the same as or somewhat smaller than the inside section of the sleeve. Thus the end of optical fiber ribbon bundle becomes tightly fitted together in the sleeve. The sleeve may be pressed into any shape. Subsequently the optical fiber ribbon bundle inserted in the pressed sleeve is cut off with a cold or heated cutter 8, as shown in FIG. 3e.

This process can be accomplished without damaging the optical fibers because coating layers 4 exists between the inner surface 5 of the sleeve 2 and optical fiber arrangement 3. Thus the initial optical characteristic can be maintained.

An end structure of a single or bundle optical fiber ribbons according to the invention, which is formed in the process above-described, is advantageous in simplicity in structure, tightly fitted-in optical fiber ribbons in a sleeve member, low working cost, and any intended sectional shape such as circular or rectangular figure.

What is claimed is:

1. An end structure for at least one optical fiber ribbon, said at least one optical fiber ribbon comprising a plurality of optical fibers which are arranged in the form of a tape and having a coating layer on one side of said tape for holding them together, wherein the sameside end of said at least one optical fiber ribbon is bundled together and tightly fitted in a metallic sleeve member so that the inner surface of said metallic sleeve member is adjacent to only said coating layer of said at least one optical fiber ribbon, and said coating layer of each optical fiber ribbon is adjacent to at least one of said inner surface of said metallic sleeve member, a non-coating layer side of said tape comprising said at least one optical fiber ribbon, and a non-coating layer side of another optical fiber ribbon.

2. An optical fiber bundle comprising at least one optical fiber ribbon, said at least one optical fiber ribbon comprising a coating layer having a first and second side, a plurality of optical fibers which are arranged in the form of a tape, one side of said tape being affixed to said first side of said coating layer, and an end structure, said end structure comprising a metallic sleeve member having an inner surface wherein the improvement comprises said ribbon being bundled such that the outside of said bundle comprises only said second side of said coating layer, and said coating layer of each optical fiber ribbon is adjacent to at least one of said inner surface of said metallic sleeve member, a non-coating layer side of said tape comprising said at least one optical fiber ribbon, and a non-coating layer side of another optical fiber ribbon, and wherein said bundle is tightly fitted within said metallic sleeve member.

3. The optical fiber bundle of claim 2, wherein said sleeve member is pressed into a desired shape.

4. The optical fiber bundle of claim 3, wherein said shape is substantially circular.

5. The optical fiber bundle of claim 3, wherein said shape is substantially rectangular.

6. The optical fiber bundle of claim 3, wherein said shape is substantially square.